United States Patent [19]
Fries et al.

[11] 3,977,932
[45] Aug. 31, 1976

[54] METHOD AND APPARATUS FOR POST FORMING LAMINATES

[75] Inventors: Bernard J. Fries, Jenison; Lance E. Molander, Grand Rapids, both of Mich.

[73] Assignee: Steelcase, Inc., Grand Rapids, Mich.

[22] Filed: Feb. 3, 1975

[21] Appl. No.: 546,311

Related U.S. Application Data

[62] Division of Ser. No. 386,533, Aug. 8, 1973, Pat. No. 3,888,613.

[52] U.S. Cl. .............................. 156/212; 156/216; 264/322; 264/324
[51] Int. Cl.² ........................................ B29C 17/04
[58] Field of Search ........... 156/204, 212, 213, 214, 156/216, 217, 272, 282, 311, 322, 323, 443, 479, 499, 224; 264/322, 324; 181/33 GA; 425/174.4

[56] References Cited
UNITED STATES PATENTS

| | | | |
|---|---|---|---|
| 2,433,643 | 12/1947 | Beach et al. ........................ | 264/322 |
| 2,648,370 | 8/1953 | Beach ............................. | 264/322 X |
| 3,580,770 | 5/1971 | Dyal ............................... | 156/479 X |
| 3,615,149 | 10/1971 | Malone et al. .................... | 264/324 X |
| 3,616,076 | 10/1971 | Gepkins ............................ | 156/479 |
| 3,668,033 | 6/1972 | Evans ............................. | 156/499 X |

*Primary Examiner*—David A. Simmons
*Attorney, Agent, or Firm*—Price, Heneveld, Huizenga & Cooper

[57] ABSTRACT

A method and apparatus for post forming laminate tops. A top substrate and its overhanging laminate are mounted on a pivotable supporting table. When the table is in a first position, the overhanging laminate is adjacent a heater of generally C-shaped cross section. The heater can be pivoted into a position embracing the overhanging portion of the laminate. The laminate is very rapidly heated to a temperature of approximately 335° to 365°F., preferably within a period of about from 12 to 16 seconds. The ambient heater temperature is roughly from 550° to 750°F. As soon as the laminate has been heated, the heater pivots out of position. The table pivots upwardly, thereby wiping the overhanging laminate past the bottom edge of a former. The former then moves forwardly and, due to a generally C-shaped cross section, firmly clamps the overhanging laminate around the periphery of the substrate. After cooling, the former is retracted and the post formed top can be removed.

28 Claims, 19 Drawing Figures

METHOD AND APPARATUS FOR POST FORMING LAMINATES

CROSS-REFERENCE TO RELATED APPLICATION

This is a division of application Ser. No. 386,533, filed Aug. 8, 1973 for Post Forming Laminates now U.S. Pat. No. 3,888,613.

BACKGROUND OF THE INVENTION

The present invention relates to a method and apparatus for post forming laminate tops. Post formed tops are made by adhering a sheet of laminate material to a top substrate, either wood or metal and forming a suitable edge thereon. The laminate may be either a thermosetting material or a thermoplastic material such as vinyl. The most commonly used laminate employs a melamine overlay on a thermolinking phenolic substrate. This is the most readily available laminate and is intended for use with both metal and wooden top substrates.

The basic first step in any post forming operation is adhering the laminate to the top substrate. A portion of the laminate overhangs the periphery of the substrate and must be formed downwardly over the periphery of the substrate. In the past, the most critical problem encountered in this operation is that of the overhanging laminate cracking as it is formed over the periphery of the substrate. It has proven particularly difficult to perform this operation where the top substrate is made of metal. Further, there are severe limitations on how tight a radius the laminate can be formed over. Typically, prior artisans have been able to form laminates only to a ⅝ inch radius. Also, it has been necessary for prior artisans to use thinner laminates in order to minimize cracking, i.e. laminates of approximately 0.030 inches.

Prior art methods typically teach heating only the top surface of the laminate, perhaps to avoid overheating and blistering. Also, prior art methods teach heating the overhanging laminate portion relatively slowly, again apparently in order to avoid blistering of the laminate. It has been generally accepted in the industry to employ some type of heat source, radiant or contact, at approximately 350° F. for a period of roughly 35 to 45 seconds. Most manufacturers then relatively slowly fold the overhanging laminate over the periphery of the substrate. Some attempt to do this more quickly, but their complicated mechanisms typically cannot form very rapidly.

Prior art forming devices themselves often create problems. This is particularly true when the laminate must not only be formed over the upper edge of the substrate, but also over its lower edge. One mechanism for achieving this uses two separate former bars and two separate drive mechanisms for them. The first former bar is used to make the first corner and a second former bar is used to make the second corner. However these mechanisms are cumbersome and have not contributed significantly to the solution of the laminate cracking problem.

One prior art technique which has been devised to minimize cracking involves taping the top surface of the overhanging laminate portion prior to heating. Some may also tape the bottom surface. The overhanging portion is then heated and formed. The tape is supposed to minimize laminate cracking. One very significant problem with the method, however, is that the tape must be peeled off of the exposed surface of the laminate after it has been formed. This is a costly and messy operation.

Accordingly, there has been a significant need for a method and apparatus for post forming laminate tops which will be capable of commercial operation with only a minimum of scrap as a result of cracked laminate surfaces.

SUMMARY

The present invention minimizes cracking, makes it possible to use thicker laminates, i.e. as thick as 0.050 inches, makes it possible to form the laminates on tighter radiuses, i.e. ⅜ of an inch, and is far more successful when used in forming laminates over metal top substrates. In the present invention, a method and apparatus are employed which rapidly heat the overhanging laminate portion at inordinately high temperatures and in a very short time and thereafter rapidly form the laminate around the periphery of the substrate. To effect this rapid heating, a heater is employed which is generally C-shaped in cross section and which embraces the overhanging laminate portion. Thus, it applies heat to the laminate on both sides thereof. Preferably, the heater includes heat sources positioned both above and below the overhanging laminate. This heater is maintained at an ambient temperature of roughly 550° to 750° F. and the laminate is heated in the heater for a period of only 10 to 16 seconds. The temperature of the laminate at the end of this heat cycle is roughly 335° to 365° F.

At the end of the heating cycle, the heater is moved immediately away and a former of generally C-shaped cross section is employed to first wipe the laminate downwardly over the upper edge of the substrate and then drive the laminate back under the substrate, i.e. over the bottom edge of the substrate. The former is generally C-shaped and thereby tightly clamps the laminate against the substrate at the periphery of the substrate. Preferably, the wiping action is achieved by employing a pivotally mounted table which is pivoted upwardly until the overhanging laminate is wiped downwardly by engagement with the bottom of the former. The bottom leg and back wall of the former are then driven forwardly by a separate mechanism so as to complete the forming step and clamp the overhanging laminate portion tightly against the periphery of the top substrate. This arrangement greatly simplifies the apparatus required for forming and makes it possible to form more rapidly. Preferably, a cushioning material at the back wall of the former helps to absorb the shock of the former coming into engagement with the periphery of the top substrate.

Another aspect of this invention is particularly useful in connection with forming laminate over metal substrates. This seems to be a particularly difficult task when employing prior art methods. It has been found that the problems of employing metal substrates can be minimized by adhering an insulating strip to the top of the substrate generally adjacent the peripheral edge thereof. The laminate is adhered to the top of the substrate right over this insulating strip. Preferably, a strip of very thin Kraft paper is employed. This insulating strip aids the heating process by minimizing the dissipation of heat from the overhanging laminate portion through the metal substrate. The minimization of heat dissipation facilitates rapid heating of the overhanging laminate portion and helps keep that portion hotter during the actual forming step. While this aspect of the invention is particularly useful in conjunction with the method and apparatus described immediately above, it is believed that it would also be helpful when used in conjunction with other heating and forming techniques.

These and other aspects, objects and advantages of the invention will be more fully understood and appreciated by reference to the written specification and appended drawings.

PREFERRED EMBODIMENT

Figure 1:
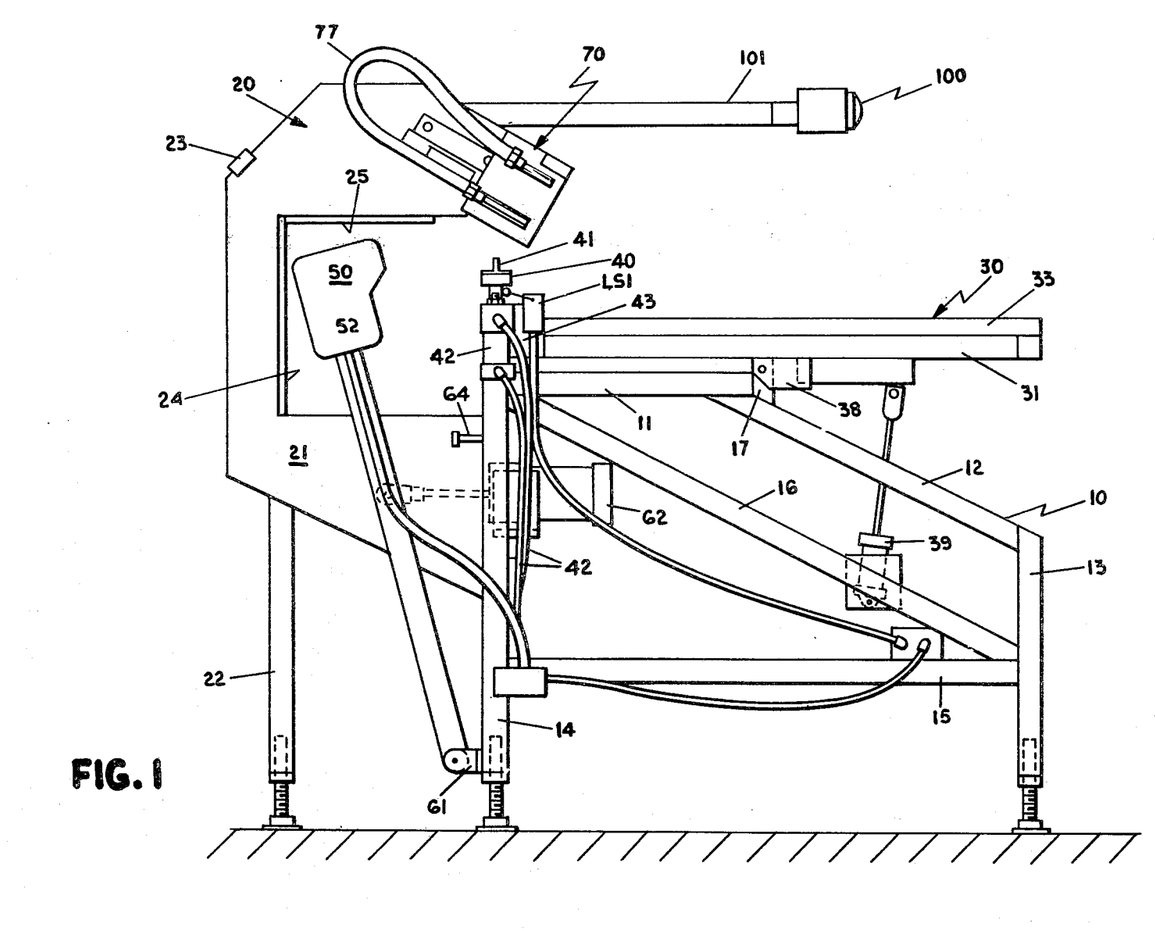
FIG. 1 is an end elevational view of the apparatus.
Figure 3:
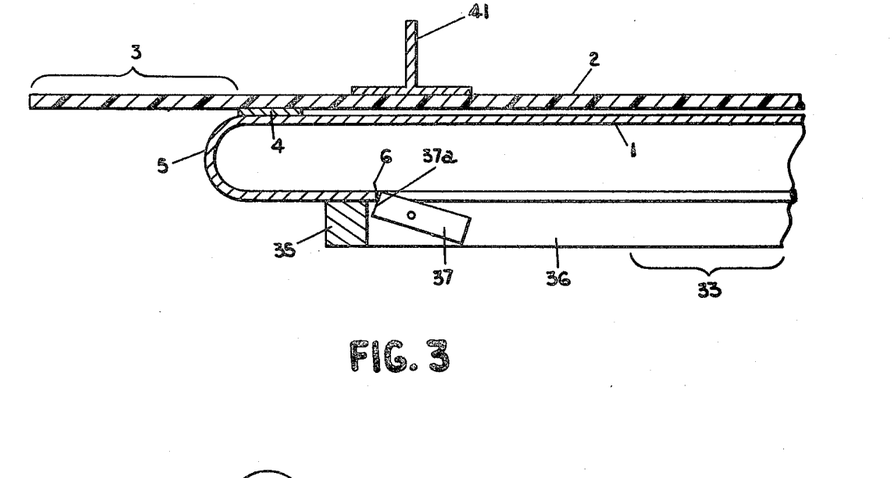
FIG. 3 is a fragmentary cross-sectional view showing the substrate and its overhanging laminate seated on the supporting table of the apparatus.
Figure 10:
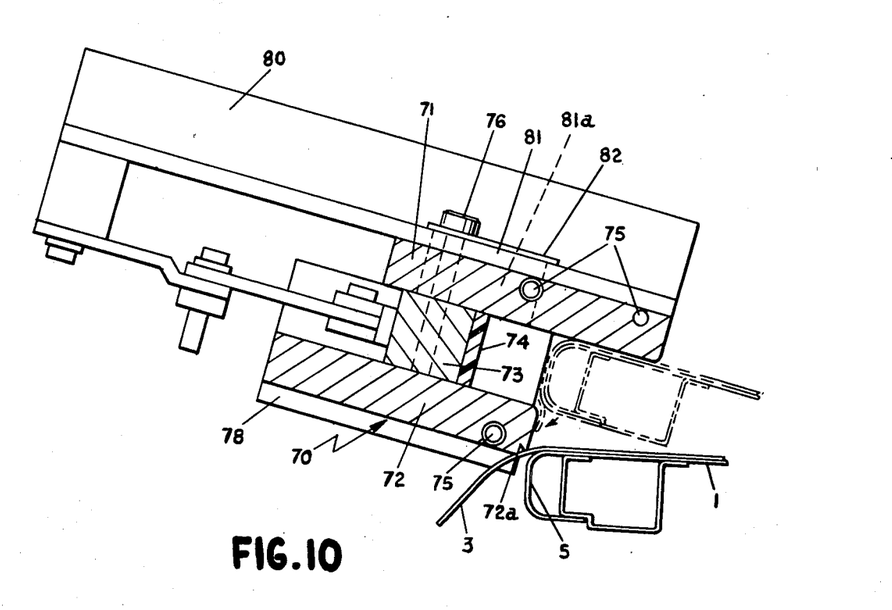
FIG. 10 is a fragmentary cross-sectional view showing the manner in which the overhanging laminate is wiped downwardly by the former as the substrate supporting table is pivoted upwardly.
Figure 11:
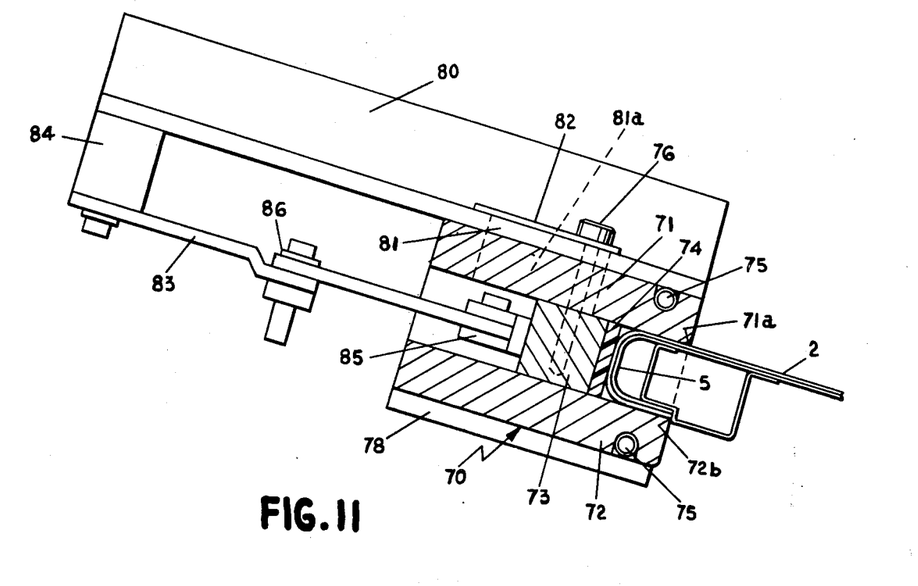
FIG. 11 is the same view as FIG. 10 except that the former has been driven into clamping relationship with respect to the overhanging laminate and the top substrate.

The present invention comprises a method and apparatus for post forming laminate tops in which a sheet of laminate material 2 is adhered to a top substrate 1 such that a portion of laminate 2 hangs over the edge of substrate 1 as shown at 3 in FIG. 3. In the preferred embodiment, the post forming apparatus comprises a table 30, for supporting a top substrate thereon, pivotally mounted to a frame 10 (FIG. 1). Clamp 40 mounted at the rear edge of table 30, or left edge as viewed in FIG. 1, is used to clamp a top substrate and its overhanging laminate to table 30. Positioned generally at the rear edge of table 30 is a heater 50 which is pivotally mounted by support 60 to frame 10. Heater 50 can be pivoted from its at rest position as shown in FIG. 1 forwardly until the overhanging laminate portion is embraced within heater 50 (see FIG. 6). Heater 50 is generally C-shaped in configuration (FIG. 6) and heats the overhanging laminate portion 3 very rapidly to a temperature of approximately 335° to 365° F. Heater 50 has an ambient temperature of approximately 550° to 750° F. and the overhanging laminate portion 3 is exposed to these extremely high temperatures for a period of only about 10 to 16 seconds. After the heating cycle is completed, heater 50 is pivoted outwardly again and table 30 pivots upwardly in the manner shown in FIG. 8 so that the heated overhanging laminate portion is wiped past the lower edge of a former 70 (FIG. 10). Former 70 is generally C-shaped in cross-section and is slidably mounted on a C-frame 20 which in turn is mounted to frame 10. After table 30 has been pivoted to its full up position, former 70 is driven forwardly so that the overhanging laminate portion 3 is clamped around the edge of top substrate 1 (FIG. 11). Then table 30 is pivoted back downwardly so that a new cycle can be started.

Figure 2:
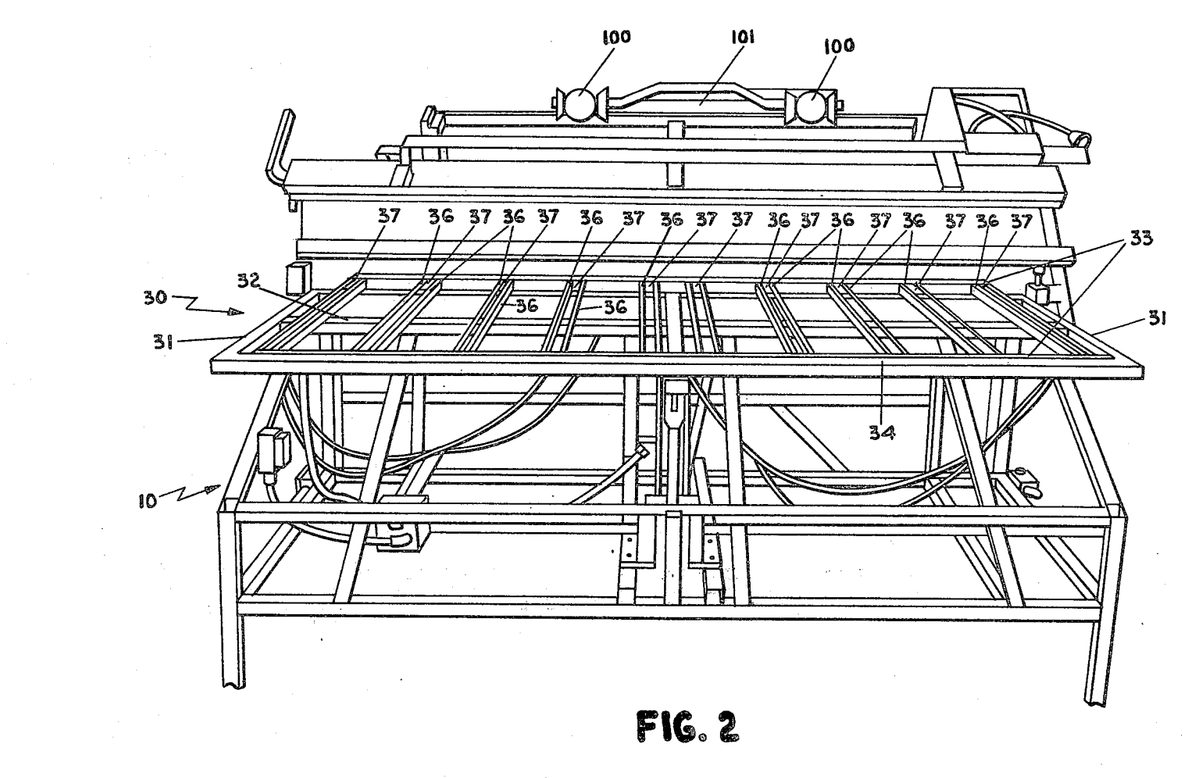
FIG. 2 is a front perspective view of the apparatus.

Table 30 comprises a supporting bed 33 mounted on a generally rectangular frame 31 (FIGS. 1 and 2). Rectangular frame 31 includes pivot brackets 38 projecting downwardly from each side thereof to facilitate pivotal mounting to frame 10 (FIG. 1). Rectangular frame 31 includes a cross beam 32 extending from one side to the other thereof generally midway between the front and rear thereof (FIG. 2). Frame 31 is formed of tubular steel or the like. Bed 33 includes a front steel beam 34 and a rear steel beam 35. Extending therebetween are a plurality of pairs of slide bars 36, so called because in order to position a top substrate 1 on table 30, the front edge thereof is slid along the slide bars 36.

Positioned just behind rear beam 35 and between each pair of slide bars 36 is a dog 37 which is pivotally mounted to its embracing slide bars 36 (FIG. 3). Its pivot point is selected such that it is overweighted towards the front of the table 30 such that the rearward edge 37a of dog 37 projects upwardly above the level of bed 33. Because of this protrusion, dogs 37 serve to position a top substrate 1 on table 30. Thus, the top substrate 1 shown in FIG. 3 includes a peripheral edge portion 5 and a returning undersurface which defines a hidden edge 6 on the undersurface of substrate 1. As top substrate 1 is slid onto table 30, it slides over dogs 37, forcing them to pivot downwardly. After the peripheral portion 5 has passed over dogs 37, they again pop up behind hidden edge 6. The operator then pulls substrate 1 back towards him until hidden edge 6 catches on the protruding edges 37a of dogs 37. This positively locates top substrate 1 and its overhanging laminate portion 3 with respect to table 30.

Figure 8:
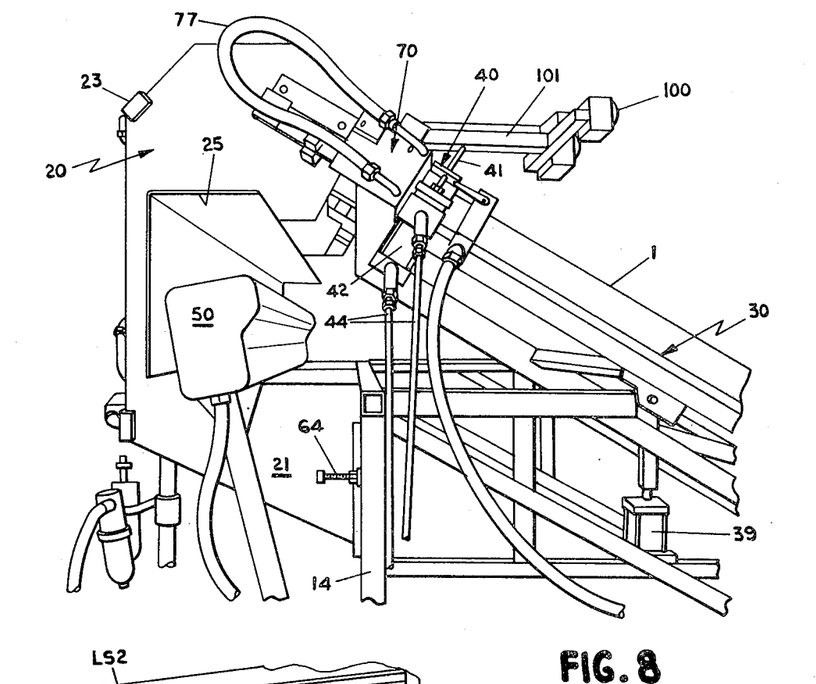
FIG. 8 is the same fragmentary perspective view as FIGS. 4 and 5, except that the support table has been pivoted and the former has been driven into its clamping position.

Frame 10 is made of tubular steel stock or the like and includes a generally horizontal section 11 and an inclined section 12 which slopes downwardly from horizontal section 11 from approximately the midpoint of frame 10. Front legs 13 support inclined portion 12 at the front of frame 10 and rear legs 14 support the rear edge of horizontal portion 11 at the rear of frame 10. Suitable lateral braces 15 and suitable inclined braces 16 serve to reinforce frame 10. Positioned approximately at the juncture of horizontal portion 11 and inclined portion 12 is a pivot mount 17 to which pivot bracket 38 of table 30 is pivotally mounted. A pivot cylinder 39 is mounted at one end to inclined brace 16 of frame 10 and to the other end to table 30 forwardly or to the right of pivot bracket 38 as viewed in FIG. 1. Activation of cylinder 39 makes it possible to pivot table 30 from its generally horizontal position as shown in FIG. 1 to an inclined position as shown in FIG. 8.

Figure 4:
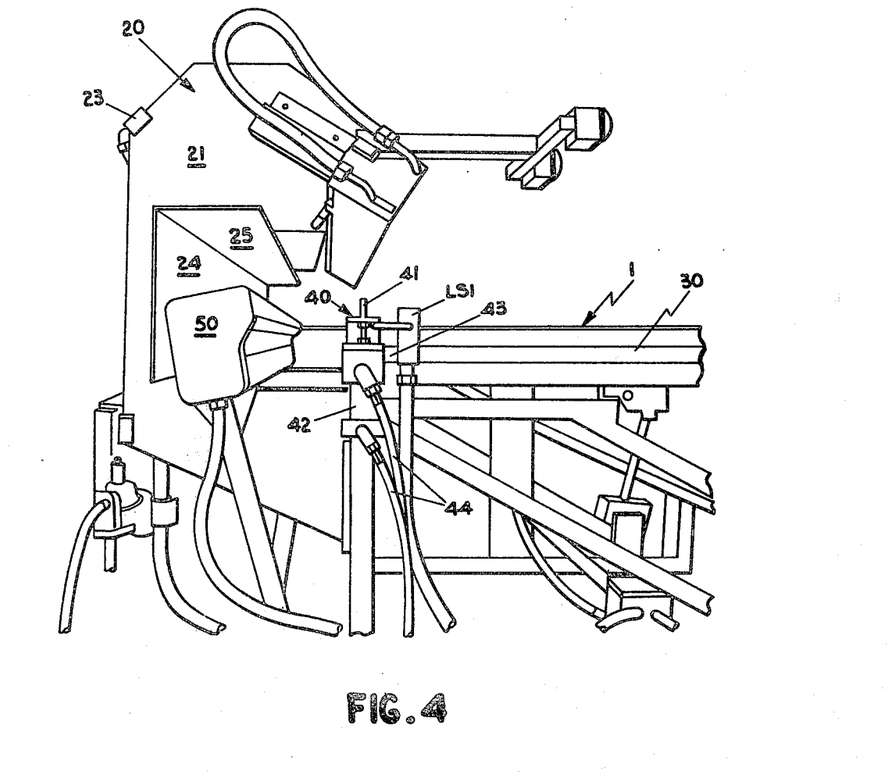
FIG. 4 is a fragmentary generally perspective end view of the apparatus with the clamp for holding the top substrate and laminate in place in its down position.

Clamp 40 at the rear edge of table 30 comprises a generally inverted T-shaped clamping bar 41 joined at its ends to the rods of cylinders 42 (FIGS. 1 and 4). A cylinder 42 on each side of table 30 is mounted to a cylinder mounting plate 43 which in turn is welded or otherwise secured to the sides of rectangular frame 31 of table 30. Thus, the entire clamping assembly 40 is mounted to table 30 and moves up and down as table 30 pivots. Flexible fluid conduits 44 are provided to cylinders 42 in order to facilitate this change in position (compare FIGS. 4 and 8). The activation of cylinders 42 causes clamping bar 41 to move downwardly towards table 30, thereby clamping top substrate 1 in its laminate 2 tightly against bed 33 (FIG. 3).

Heater 50 is positioned generally in the vicinity of the rear edge of table 30 when it is in its horizontal position (FIG. 1). Heater 50 is mounted atop a support 60 which is pivotally mounted to a pivot arm assembly 61. Pivot arm assembly 61 is in turn mounted to each rear leg 14 of frame 10. A cylinder 62 is mounted to frame 10 generally at the rear thereof with its piston joined to heater support 60. The activation of cylinder 62 causes heater 60 to move fore and aft (compare FIGS. 4 and 5). A bolt 64 threadably mounted on a leg 14 of frame 10 serves as an adjustable stop for limiting the forward movement of heater 50 (FIG. 1).

Figure 6:
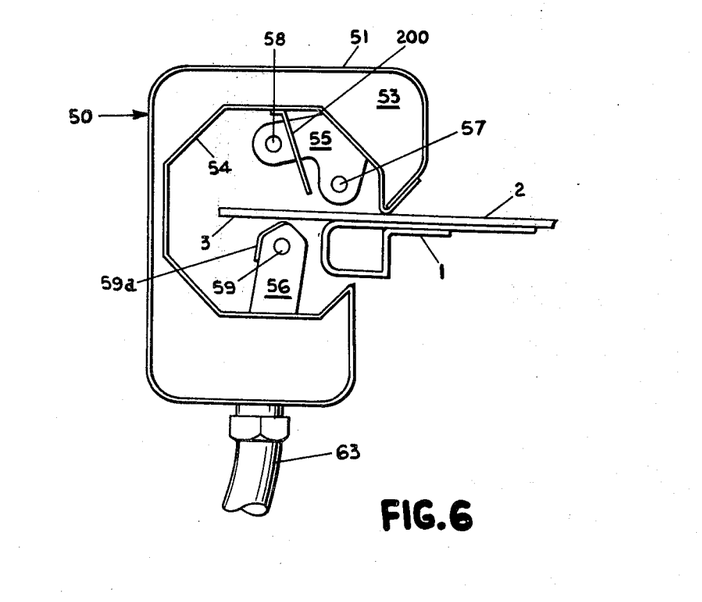
FIG. 6 is a cross-sectional view of the heater.

Heater 50 itself is generally C-shaped in configuration (FIG. 6). It has a length corresponding approximately to the length of the longest top which is to be heated therein. One example of such a heater is one approximately 79 inches long for heating tops about 70 inches long. It includes a sheet metal outer shroud 51 wrapped around a plurality of inner generally C-shaped plates 53. Shroud 51 is closed at its ends by end plates 52 (FIGS. 6 and 1). A sheet metal reflector 54 is wrapped around the inner edges of inner plates 53 and defines the enclsore into which overhanging laminate portion 3 projects. Reflector 54 is shaped to define generally a top wall 54a, generally a back wall defined by surfaces 54b, 54c and 54d, a bottom wall 54e, a bottom forwardly and upwardly sloping lip 54f, and a top downwardly and forwardly sloping lip defined by surfaces 54g and 54h. Inner plates 53 are shaped such that their top forward portions overhang their bottom forward portions. Thus the top lip 54a and 54h projects forwardly farther than bottom lip 54f. Mounted to a forward and downwardly sloping wall 54g of reflector 54 is a top element supporting bracket 55. Mounted to a bottom generally horizontal bottom wall 54 of reflector 54 is a bottom element supporting bracket 56. There are a plurality of such brackets spaced along the length of heater 50. Each top bracket 55 is generally V-shaped in configuration. In the heater for heating 70 inch tops, a 3600 watt electric heating element 57 is mounted on the lower leg of brackets 55 so that it is positioned fairly closely to the overhanging laminate portion 3, approximately 7/16 of an inch above the top thereof. It has an effective heating length of about 76¾ inches long and has a wattage density of fourty watts per square inch. A second electric heating element 58 of approximately 1600 watt capacity is mounted on the upper leg of brackets 55 so that it is positioned somewhat rearwardly and upwardly from 3600 watt element 57, approximately 15/16 of an inch above the top of the laminate and approximately 1⅝ inches from heating element 57. It has an effective heating length of about 75¼ inches and a wattage density of 20 watts per square inch. Mounted on bottom brackets 56 is a bottom 2500 watt element 59, approximately ⅞ of an inch below the bottom of the overhanging laminate portion 3. It has an effective heating length of about 75½ inches and a wattage density of about 28 watts per square inch. When overhanging laminate portion 3 is enshrouded within heater 50, bottom 2500 watt element 59 is positioned below the lower surface of overhanging laminate portion 3 while upper elements 57 and 58 are positioned above the upper surface of overhanging laminate portion 3. While the exact manner in which these various heating elements function is somewhat theoretical, it is thought that the primary function of upper heating element 57 is to concentrate a line of heat at the point at which the laminate must first be bent, that the primary function of upper heating element 58 is to maintain the ambient temperature within the heater 50, and that the primary function of upper heating element 58 is to maintain the ambient temperature within the heater 50, and that the primary function of bottom heating element 59 is to maintain the peripheral edge of the substrate top 1 at a relatively high temperature must prior to actual forming of the overhanging laminate portion 3 therearound. To the extent that this theory is correct, it is particularly important to maintain a fairly concentrated source of heat along the line at which the laminate 2 is first bent. Thus, as heretofore explained, heating element 57 is a 3600 watt element having a wattage density of about 40 watts per square inch.

Mounted on the brackets 56 to the rear of heating element 59 and partially enshrouding the top thereof is a heat shield 59a. It extends generally the length of heater 50 and functions to concentrate the heat from heating element 59 forwardly and slightly downwardly onto the surface of the periphery of desk top substrate 1. This prevents the overhanging laminate portion 3 from being overheated by bottom heating element 59.

Mounted between top heating element 57 and top heating element 58 is a copper screen 200 which serves a function similar to shield 59a. Copper screen 200 is secured directly to reflector 54 and serves to prevent heat from being concentrated on the surface of overhanging laminate portion 3 at a point generally between heating elements 57 and 58. Copper screen 200 tends to conduct heat from the space between heating elements 57 and 58 to the surrounding shield 54, thereby tending to better distribute the heat within the overall heater interior.

Figure 14:
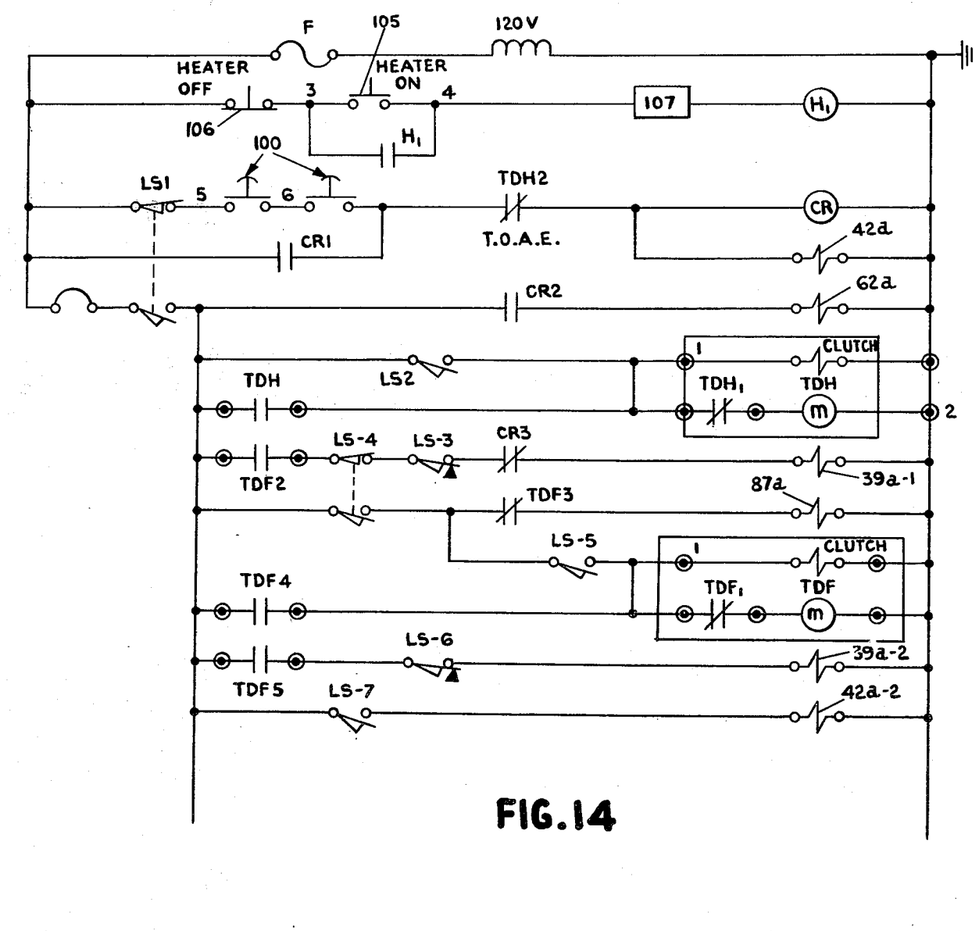
FIG. 14 is a schematic diagram of the control system for the apparatus.

A suitable heater control, shown in block form as 107 in the schematic diagram of FIG. 14, makes it possible to selectively activate any one or any combination of heater elements 57, 58 and 59. While in most cases it will be desirable to have all three elements activated, there may be specific laminates for which selective activation is more desirable. A suitable flexible power line 63 leads from heater 50 to heater control 107. A heater "on" switch 105 and a heater "off" switch 106 close or open the basic power circuit to heater control 107 (FIG. 14).

It will be understood that variations in the wattages indicated may be possible in different situations. Different laminates may require different heater arrangements. However, it is desirable to maintain as closely as possible the wattage densities for the various heating elements which have been suggested above.

For most applications, the ambient temperature within heater 50, i.e. within the enclosure defined by reflector 54, is approximately between 550° and 750° F. While the temperature is typically not uniform throughout the enclosure this range gives a rough approximately of the range of temperatures which exist within the enclosure. In most applications, it has been found that the best results are achieved by exposing the overhanging laminate portion 3 to these extraordinarily high temperatures for a period of only about 10 to 16 seconds.

Figure 12:
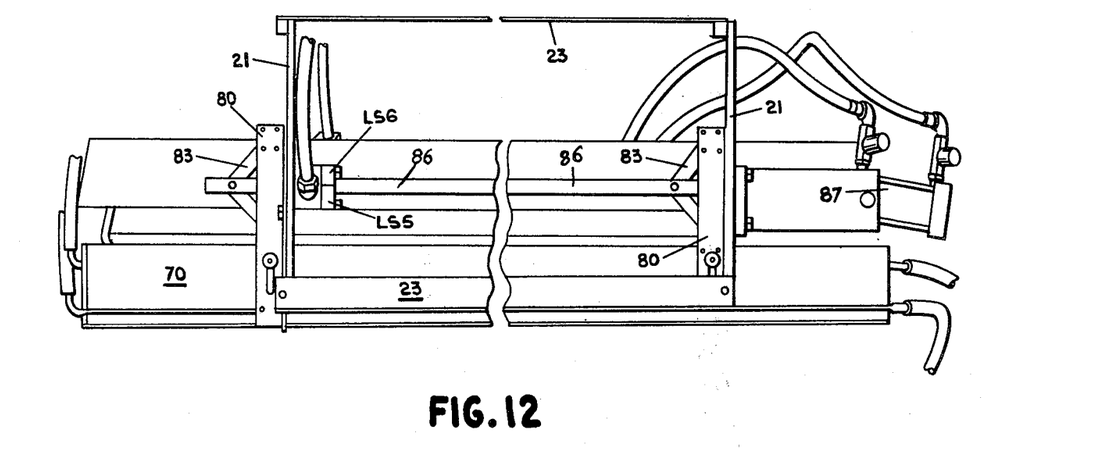
FIG. 12 is a broken plan view showing the drive mechanism for the former.

Former 70 is slidably mounted at the top front of a generally C-shaped supporting frame 20 (FIG. 1). C frame 20 comprises a plurality of generally C-shaped plates 21 joined by a steel back plate 24, a steel top plate 25 and front and back, steel tie bars 23 (FIGS. 1, 4 and 12). C plates 21 are welded at their bottom portions to the rear of frame 10. Frame 20 must be generally C-shaped in configuration in order to allow room for heater 50 to move forwardly and rearwardly with respect to the rear edge of table 30. C frame 20 is supported at its rear by legs 22.

Former 70 itself comprises a top aluminum plate 71 joined to a bottom aluminum plate 72 by means of an intermediate back plate 73 (FIGS. 10 and 11). Top plate 71 is fixed while back plate 72 and bottom plate 73 are joined and are movable with respect to top plate 71. Top plate 71 and bottom plate 72 both project forwardly and rearwardly from back plate 73. The front portion of former 70 is thus generaly C-shaped in cross section so that the overhanging laminate portion 3 can be positively clamped around the peripheral edge 5 of top substrate 1 (FIG. 11). The distance from top plate 71 and bottom plate 72 is approximately the same as the thickness of the combined substrate 1 and wrapped laminate portion 3. A strip of cushioning material 74 is adhered to the front surface of back plate 73 to provide a cushion when former 70 is driven home against the peripheral edge 5 of top substrate 1. The ends of former 70 are closed off by end plates 78. Because the peripheral areas of top substrate 1 and laminate portions 2 and 3 will be hot after leaving heater 50, former 70 is provided with cooling means. Coolant tubes 75 pass through top plate 71 and bottom plate 72, the top and bottom coolant lines 75 being connected at one end by a flexible coolant conduit 77. Conventional coolant solutions can be used. These cool the thermoplastic adhesive used to hold laminate portion 3 to top periphery 5.

Former 70 is slidably mounted on several angle irons 80, (FIGS. 10 and 11). Each angle 80 is bolted or otherwise secured to a C plate 21 (FIG. 12). Top plate 71 of former 70 is secured to angle 80 and is secured against movement with respect thereto. The leg of angle 80 which projects away from C plate 21 includes a slot 81 therein through which a slide bolt 76 passes (FIGS. 10 and 11). Slide bolt 76 passes through a slot 86 in top plate 71 and is then bolted into back plate 71 of former 70. Back plate 73 and bottom plate 72 of former 70 are free to slide with respect to angle 80 and top plate 71 the length of slots 81. A slotted wear plate 82 is mounted to coincide with slot 81 so that the head of bolt 76 slides on wear plate 82.

The drive for former 70 is provided by a toggle arrangement. A toggle 83 is operably connected to at least two of the track angles 80 (FIGS. 10, 11 and 12). Each toggle 83 is connected at its forward end to a front toggle mount 85 which in turn is secured to the back of back plate 73 of former 70. The rear portion of each toggle 83 is joined to a rear toggle mount 84 which in turn is joined to track angle 80. The toggles 83 are then kinked or alternatively straightened by means of a toggle bar 86 joined to each toggle 83 and connecting the toggles 83. Toggle bar 86 is itself connected at one end to a cylinder 87 which reciprocates toggle bar 86 to the left and right as viewed in FIG. 12. This action drives back plate 73 and bottom plate 72 of former 70 forwardly or rearwardly along track angle 80 to the extent allowed by the length of slots 81 and 81a.

Angles 80 are oriented on an incline which corresponds to the angle of incline of table 30 when it is pivoted to its upward position as shown in FIG. 8. Accordingly, the back 73 and bottom 72 of former 70 move forwardly and rearwardly in the same general plane as a top 1 would lie when mounted on table 30 with table 30 in its inclined position. As table 30 is pivoted upwardly by its pivot cylinder 39, the overhanging laminate portion 3 is pivoted upwardly until it engages the bottom leading edge of bottom plate 72 of former 70. To prevent scarring or other damage to overhanging laminate portion 3, the leading bottom edge 72a of bottom plate 72 of former 70 is rounded. As top 1 is pivoted past bottom plate 72, bottom plate 72 serves to wipe overhanging laminate portion 3 downwardly over the peripheral edge 5 of top substrate 1. FIG. 10 shows this wiping process as it is beginning. The final position of overhanging laminate portion 3 after the wiping process is completed is shown in phantom in FIG. 10. Overhanging laminate portion 3 is in the position shown in phantom at the time top 1 is in direct alignment with the opening in former 70, as indicated in phantom in FIG. 10. Once top 1 is in the position shown in phantom in FIG. 10, the back 73 and bottom 72 of former 70 are driven forwardly by the activation of cylinder 87 to the position shown in FIG. 11. Again to prevent scarring or other damage to the overhanging laminate portion 3, the leading inside edges of top plate 71 and bottom plate 72, respectively, i.e. edges 71a and 72b, are rounded.

OPERATION AND CONTROL

The operational cycle of the apparatus is initiated by depressing run buttons 100 (FIGS. 1, 2 and 14). Run buttons 100 are mounted on a generally T-shaped mounting frame 101 which is mounted to C frame 20 and projects outwardly therefrom so that run buttons 100 are positioned generally above and towards the front of table 30.

Figure 15:
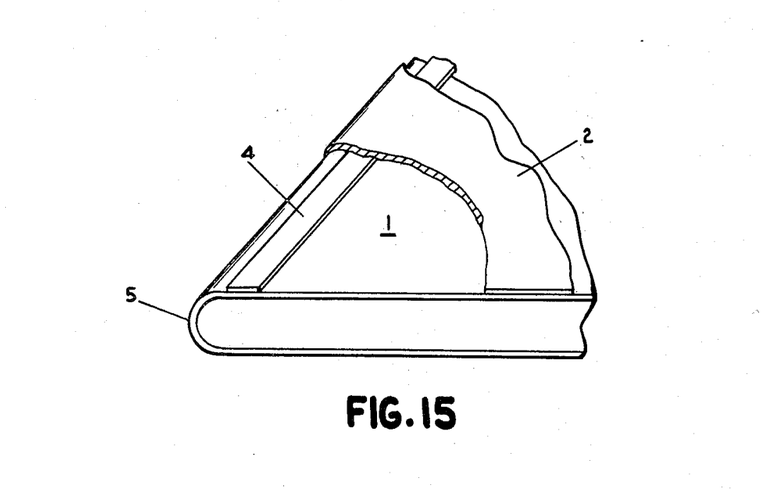
FIG. 15 is a fragmentary perspective view of a completed top.

Before the apparatus described above is put into operation, the top which is to be post formed must be prepared. A suitable piece of laminate 2 is adhered to the top surface of a top substrate 1 in a conventional manner, the thickness of adhesive being somewhat exaggerated in the cross section shown in FIG. 3. In one aspect of this invention, it has been found advantageous to adhere an insulator strip 4 to top substrate 1 generally adjacent the peripheral portion 5 thereof (FIGS. 3 and 15). A thin strip of Kraft paper having a thickness of approximately 0.008 inches is suitable. Masking tape also is suitable. Masking tape is approximately 0.006 inches thick. The Kraft paper 4 acts as an insulator to prevent heat in the overhanging laminate portion 3 from dissipating into the metal top substrate 1. This facilitates the rapid heating of overhanging laminate portion 3. The employment of the insulator strip 4 makes it possible in many instances to post form a sheet of laminate 2 over a metal top substrate 1. This has been particularly difficult to achieve in the past and most systems form the laminate over a wooden substrate. To be sure, the method as performed with the present apparatus is sufficiently advantageous in and of itself that the employment of the insulator strip 4 is not absolutely essential in all applications. Typically, the determination of whether or not it is necessary to employ insulator strip 4 depends on the type of laminate which is used.

Laminates, of course, vary greatly. Both thermoplastics and thermosetting materials are used. Vinyl is an example of a thermoplastic laminate which is often used. To be sure, forming temperatures and times would vary greatly if one were to use a thermoplastic instead of a thermoset. The conditions set forth herein assume the use of a thermoset. However, the most desirable laminate from a general use, cost and availability standpoint is one comprising a melamine overlay on an inner phenolic thermolinking substrate. Naturally, even laminates within this class tend to vary in their properties.

The heating elements in heater 50 are turned on at the beginning of the day by means of heater on switch 105. Heater 50 is allowed to heat up to an ambient temperature of generally between 550° and 750° F. The heater then remains at this temperature for the duration of a manufacturing run. To be sure, the exact temperature within heater 50 may have to be varied depending on the type of laminate material which is to be post formed.

Once the top has been prepared in this manner, it is slid into position on table 30. Its forward peripheral edge portion 5 slides over the dogs 37, depressing their protruding portions as it does so, until the dogs 37 pop back up again with their protruding edges 37a positioned behind the hidden edge 6 of top substrate 1. The operator then pulls the top towards himself until hidden edge 6 catches on the protruding edge portions 37a of dogs 37.

Figure 5:
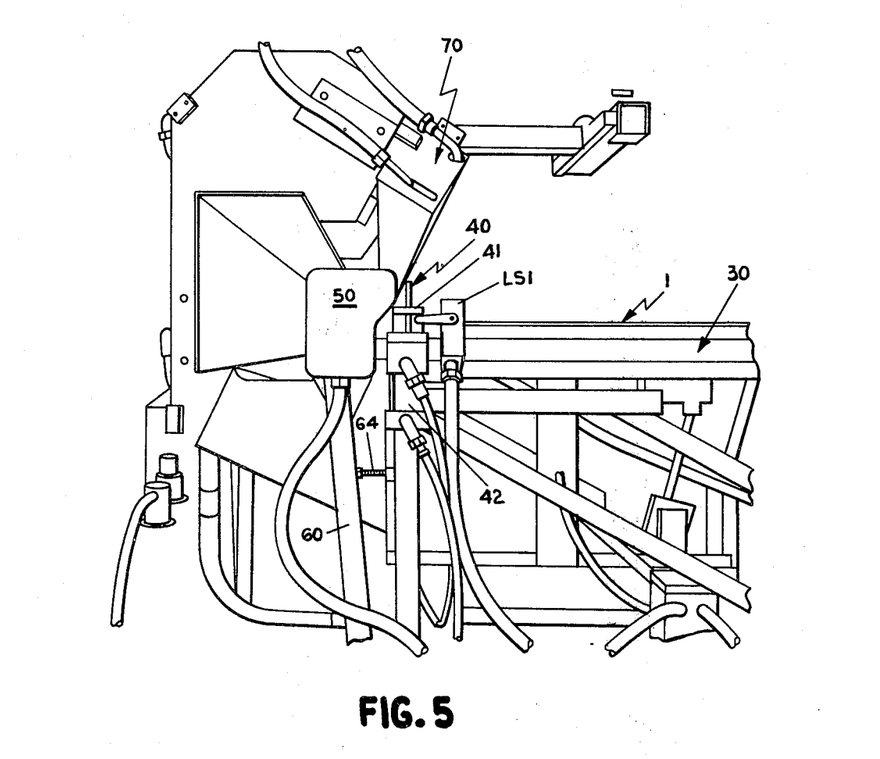
FIG. 5 is the same view as FIG. 4 after the heater has come forward to generally embrace the overhanging portion of the laminate.

With the top so positioned on table 1, the operator pushes the two run buttons 100 generally at the front of the apparatus (FIGS. 1 and 2). Referring to the schematic drawing shown in FIG. 14, it can be seen that the depression of run buttons 100 activate a relay CR which closes a latch circuit through normally open contacts $CR_1$ around run buttons 100. This also provides power to solenoid valve $42a$-1 which activates clamping cylinders 42. Also, contacts $CR_2$ are closed and normally closed contacts $CR_3$ are opened. Solenoid valve $42a$ is a dual solenoid valve activated in one direction through $42a$-1 and in the other direction through $42a$-2. As clamping cylinders 42 draw clamping bar 41 downwardly onto laminate 2 and top 1, clamping bar 41 engages the control arm on a limit switch $LS_1$ (compare FIGS. 1 and 4). The closing of $LS_1$ completes a circuit to a solenoid valve $62a$ controlling heater cylinder 62, thereby causing cylinder 62 to bring heater 50 forwardly until support 60 hits stop 64 (FIG. 5). At this point, the overhanging laminate portion 3 is embraced within the generally C-shaped heater 50 in the manner shown in FIG. 6.

Figures 7, 9:
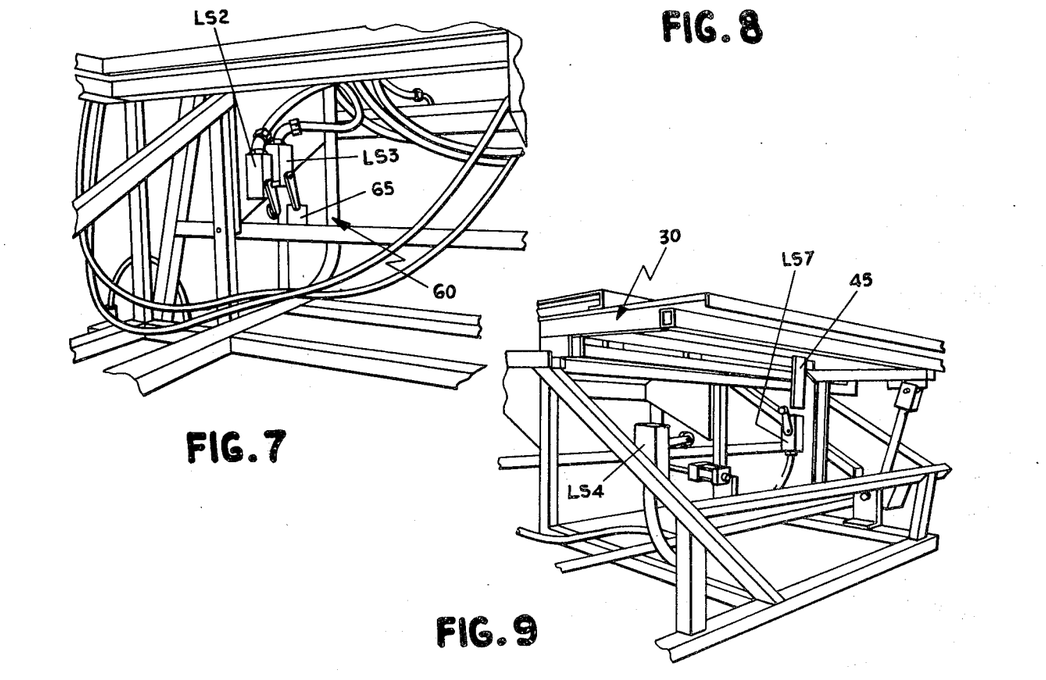
FIG. 7 is a fragmentary perspective view taken beneath the supporting table and showing the relationship between two control switches and the heater support arm.
FIG. 9 is a fragmentary perspective view below the supporting table showing the relationship of two more control switches with respect to the supporting table.

As heater support 60 comes forwardly, a paddle 65 mounted thereon disengages the control arm on limit switch $LS_3$, thereby allowing the same to open, and engages the control arm of a limit switch $LS_2$ (FIG. 7). Referring again to FIG. 14, it will be seen that the closing of normally opened limit switch $LS_2$ completes a circuit to a time delay indicated generally as TDH. When TDH times out, it opens the normally closed contacts $TDH_2$ in the circuit to relay $CR_1$. The solenoid valve $42a$ is a dual solenoid valve and accordingly, clamping cylinders 42 remain in their clamping position so that top 1 continues to be clamped to table 30. The purpose in breaking the circuit to relay CR at this point is to cause contact $CR_2$ in the line to solenoid $62a$ to open, thereby causing heat cylinder 62 to reverse and return heater 50 to the position shown in FIG. 4. Thus, time delay relay TDH provides the means for controlling the length of the heating cycle. As noted heretofore, time delay relay TDH is typically set for a period of approximately 10 to 16 seconds.

When heater 50 moves back into the position shown in FIG. 4, paddle 65 activates the control arm on limit switch $LS_3$ (FIG. 7). This recloses limit switch $LS_3$ which had been opened when heater 50 moved forwardly, thereby completing a circuit through the normally closed contacts $TDF_2$ and $CR_3$ and through the normally closed limit switch $LS_4$ to solenoid valve $39a$-1. Solenoid valve $39a$ is a dual solenoid valve whose activation in a first direction through $39a$-1 causes cylinder 39 to pivot table 30 to the position shown in FIG. 8. This pivoting motion takes place very quickly and wipes overhanging laminate portion 3 past the bottom edge of former 70. When the table reaches the position shown in FIG. 8, it trips the control arm of a double contact limit switch $LS_4$ shown in FIG. 9 (table 30 is in its horizontal position in FIG. 9 in order that limit switch $LS_4$ can be seen more clearly). When limit switch $LS_4$ is tripped, the circuit to solenoid $39a$-1 is opened and the circuit to a solenoid valve $87a$ is closed. Solenoid valve $87a$ controls the flow of fluid to cylinder 87 and thereby activates cylinder 87 to drive back 73 and bottom 72 of former 70 forwardly from the position shown in FIG. 10 to the position shown in FIG. 11. Solenoid valve $39a$ being a dual valve, table 30 remains in its up position as shown in FIG. 8, in spite of the fact that the circuit to $39a$-1 is now open.

Figure 13:
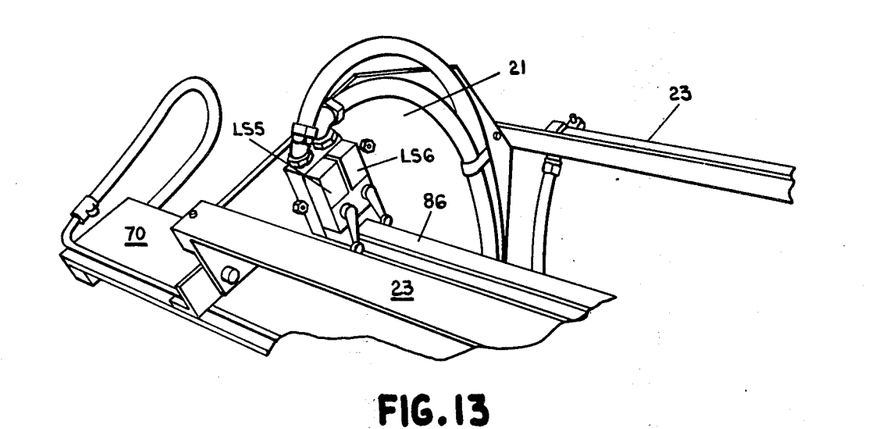
FIG. 13 is a fragmentary perspective view showing the control switches associated with the former.

As the bottom and back walls of former 70 are driven forwardly, toggle bar 86 also moves forwardly. This causes it to disengage the control lever from limit switch $LS_6$ and to engage the control lever on an adjacent limit switch $LS_5$ (FIG. 13). This closes the normally open limit switch $LS_5$ and opens the normally closed limit switch $LS_6$. Closing of the normally open limit switch $LS_5$ completes a circuit to time delay relay TDF. When time delay relay TDF times out, it opens normally closed contacts $TDF_3$ in the circuit to solenoid valve $87a$, thereby causing a reversal of cylinder 87 and causing the bottom and back walls of former 70 to retract from their position in FIG. 11 to its position in FIG. 10. Thus, the timer on time delay relay TDF controls the length of time which former 70 engages the peripheral edge portions 5 of top 1. This is referred to as the forming cycle. It has been found that a period of from 40 to 45 seconds is sufficient to effect cooling of the peripheral edge portions of the top to a point at which the overhanging laminate portion 3 is securely adhered thereto.

As the bottom and back of former 70 retract, they disengage limit switch $LS_5$ and again engages the control arm of limit switch $LS_6$ (FIG. 13). This again closes the normally closed limit switch $LS_6$, thereby again closing a circuit to solenoid valve 39a-2. Solenoid valve 39a being a dual acting valve, this reverses the flow of fluid to table cylinder 39, thereby causing table 30 to be pivoted back to its generally horizontal position as shown in FIG. 1. The return of table 1 to its generally horizontal condition causes a control paddle 45 depending downwardly from the bottom of table 30 to engage the control arm of a limit switch $LS_7$, thereby closing limit switch $LS_7$ momentarily (FIG. 9). The control arm of limit switch $LS_7$ and paddle 45 are arranged in such a relationship that as table 30 goes up, it brushes by the control arm but does not effect closure of limit switch $LS_7$. On the way back down, paddle 45 again engages the control arm from the other side, thereby effecting closure of limit switch $LS_7$ as paddle 45 passes thereby. While the closure is only momentary, it is for a sufficient time to complete a circuit to solenoid valve 42a-2. The dual acting solenoid valve 42a then acts to reverse cylinders 42, thereby retracting clamping bar 41 of clamp 40. The post formed top 1 can now be removed and the apparatus is now in condition for another cycle. The completed top 1 includes a sheet of laminate 2 adhered to the top thereof and wrapped around the peripheral edge portion 5 thereof, with, in some cases, a strip of insulating Kraft paper 4 being interposed between laminate 2 and substrate 1 generally adjacent the peripheral edge 5 of substrate 1, (FIG. 15).

Figure 16:
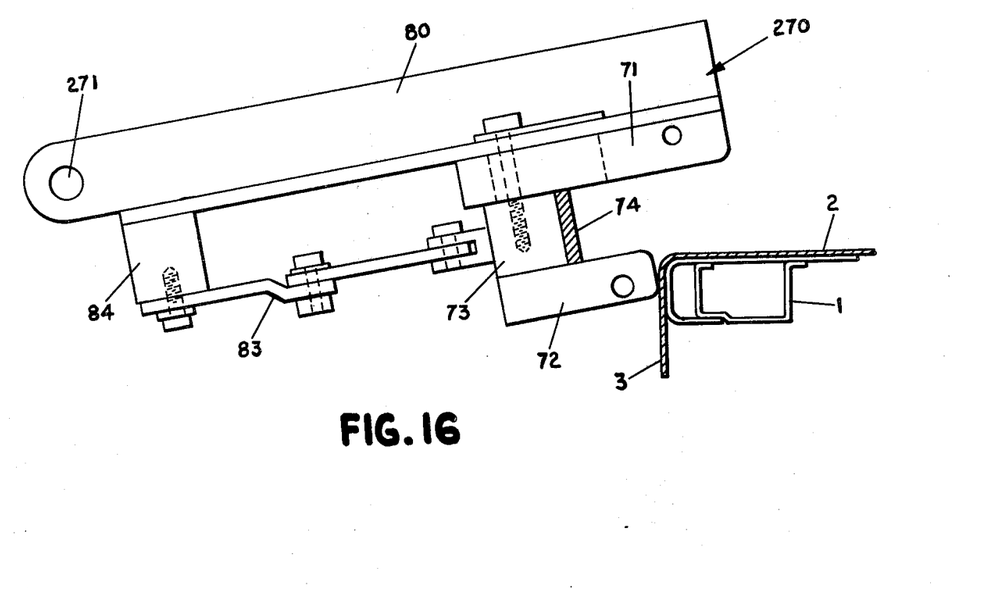
FIG. 16 is a cross-sectional view of an alternative embodiment former as it is wiped past a substrate with overhanging laminate.
Figure 17:
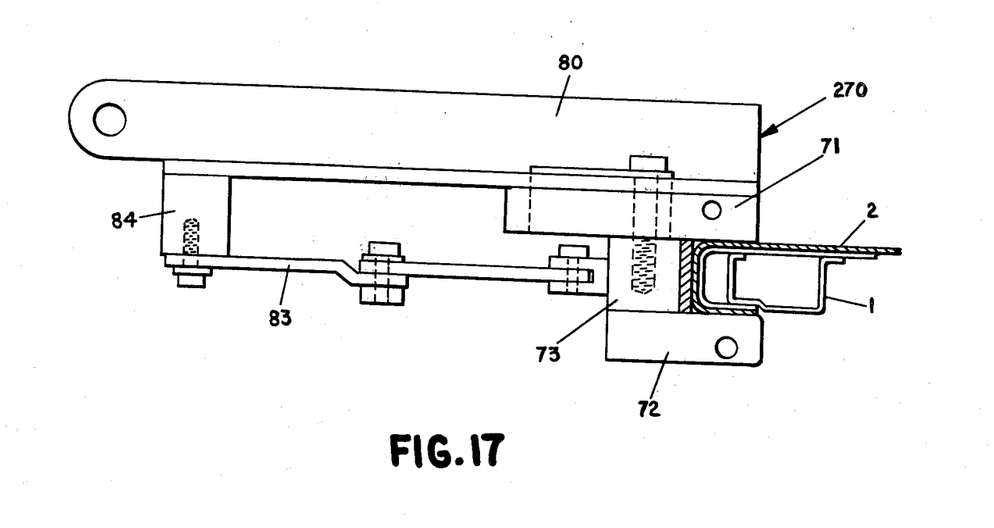
FIG. 17 is a cross-sectional view of the FIG. 16 former in which the former is shown in its final forming postion.
Figure 18:
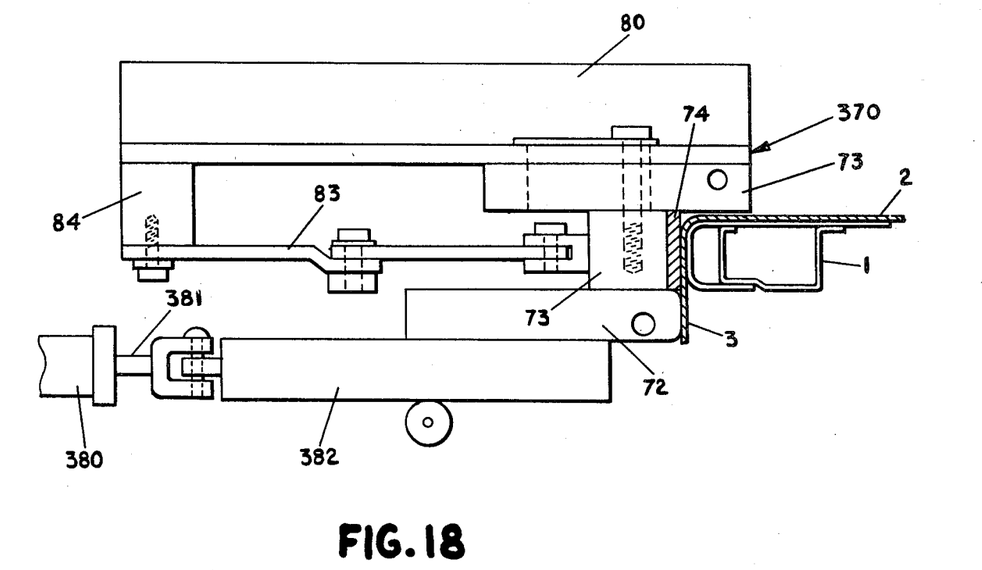
FIG. 18 is a cross-sectional view of yet another alternative embodiment former.

FIGS. 16 through 18 disclose two alternative embodiment formers. Former 270 shown in FIG. 16 is pivotally mounted at 271. Basically, this is the only distinction between former 270 and former 70. As with former 70, former 270 has a top plate 71 a back plate 73 and a bottom plate 72. The back plate 73 and bottom plate 72 of former 270 are driven forwardly by a toggle 83 which is anchored at 84 to an angle iron 80. As former 270 pivots downwardly, it wipes over the edge of overhanging laminate portion 3 and bends it over the peripheral edge of top substrate 1 (FIG. 16). Then, when top plate 71 comes into contact with the top of substrate 1 and laminate 2, back plate 73 and bottom plate 72 are driven forwardly as shown in FIG. 17 so as to complete the formation of overhanging laminate portion 3 around the peripheral edge of substrate 1. Then, back 73 and bottom 72 are retracted and former 270 pivots upwardly again back to its original position.

FIG. 18 discloses yet another alternative embodiment former 370. Former 370 does include an angle iron 80, a top plate 73, a backing plate 74 and a bottom plate 72. However, only back plate 73 is driven forwardly by toggle 83. Bottom plate 72 is separately articulated and is joined to a drive cylinder 380. The piston 381 of cylinder 380 is joined to a mounting bracket 382 which in turn travels over suitable rollers 383 as it is moved forwardly and rearwardly. Bottom plate 72 of former 370 is joined to mounting plate 382. In this embodiment, as substrate 1 is tilted upwardly, overhanging laminate portion 3 is wiped past bottom plate 72. Then, back plate 73 is driven forwardly to clamp overhanging laminate portion 3 tightly against the peripheral edge of substrate 1. Once this clamping action has taken place, bottom plate 72 is driven forwardly by cylinder 380 to complete the forming operation. After forming, back plate 73 and bottom plate 72 are retracted and substrate 1 tilts downwardly again.

Figure 19:
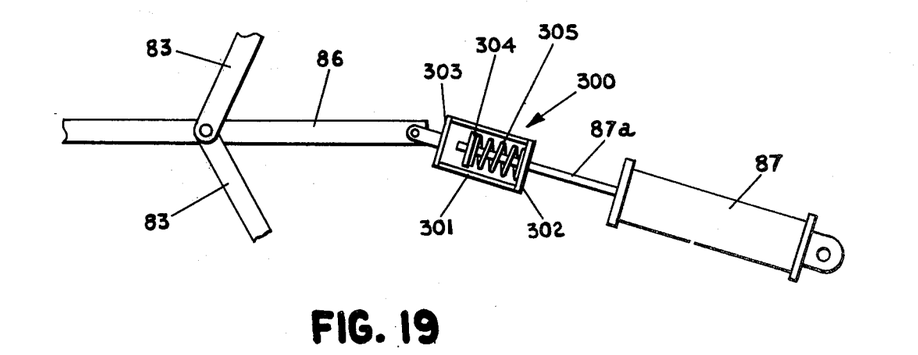
FIG. 19 is a schematic view of a shock absorption arrangement for incorporation into the former drive mechanism.

FIG. 19 discloses a shock absorption arrangement which can be used either with the first embodiment former 70, or with either of the alternative embodiment formers 270 or 370. The purpose of the shock absorption mechanism is to allow the bottom plate 72 (and back plate 73 when it is connected to bottom plate 72) to move rearwardly slightly as the top substrate 1 is wiped thereby. Basically, this shock absorption mechanism comprises a shock absorption assembly 300 interposed between the rod 87a of cylinder 87 and the end of toggle bar 86. Any type of shock absorption system would be satisfactory and that shown schematically in FIG. 19 is suitable. The rod 87a passes through a first end plate 302 of a bracket or cage 301. The second end plate 303 of cage 301 is joined to a suitable bracket to toggle rod 86. A keeper plate or washer 304 is mounted on the end of rod 87a within cage 301. A compression spring 305 is then mounted around rod 87a, between end plate 302 of cage 301 and keeper plate 304. Compression spring 305 is sufficiently stiff that it normally does not compress during the movement of the former forwardly or rearwardly as a result of movement of toggle bar 86 to the left or right. However, as top substrate 1 and its overhanging laminate 2 are wiped past the bottom plate of the former, the former can be pushed rearwardly slightly and compression spring 305 will compress in order to allow such rearward movement.

CONCLUSION

The apparatus and method set forth herein make possible operations which have heretofore been unfeasible at least from a practical standpoint. Where prior artisans have generally been limited in any commercial applications to forming laminate around wood substrates, the present invention in its various aspects makes possible forming laminate on metal substrates. Whereas prior art methods allow one to form the laminate through a radius of only about ⅝ of an inch, the present invention in its various aspects makes possible forming laminate to a radius as small as ⅜ of an inch. Whereas prior artisans have generally been limited to using laminates having a thickness of only about 0.030 inches, the present invention in its various aspects makes possible the forming of laminates having a thickness of 0.050 inches. While various of the limitations set forth above for the prior art may have been overcome in isolated instances on an isolated basis, they cannot generally be overcome to a degree sufficient to facilitate manufacturing without a substantial amount of scrap.

Accordingly, the present invention comprises a significant contribution of the art of post forming laminate tops. Of course, it will be understood that the above is merely a preferred embodiment thereof and that various changes and alterations can be made without departing from the spirit and broader aspects of the invention.

The embodiments of the invention in which an exclusive property or privilege is claimed are defined as follows:

1. A method for post forming laminate tops comprising: heating the overhanging portion of a sheet of laminate mounted on a substrate in a heater having an ambient temperature of approximately 550° to 750° F. for a period of approximately 10 to 16 seconds; removing said overhanging laminate from said heater immediately at the end of said period of time and then immediately and rapidly forming said overhanging laminate over said substrate periphery.

2. The method of claim 1 in which said forming step is conducted by wiping said overhanging laminate edge past a former to thereby wipe said overhanging laminate down over the upper edge of said substrate and then moving said former towards the substrate periphery to thereby clamp said laminate against said substrate periphery.

3. The method of claim 2 in which said heating step is conducted by employing radiant heat in a heater having a generally C-shaped cross section, said heater embracing said overhanging laminate.

4. The method of claim 1 in which said heating step is conducted by employing radiant heat in a heater having a generally C-shaped cross section, said heater embracing said overhanging laminate.

5. The method of claim 1 in which said forming step is followed by cooling said laminate and substrate periphery.

6. A method for post forming laminate tops comprising: heating the overhanging portion of laminate secured to a substrate to a temperature of at least approximately 335° F. in a period of time of approximately 16 seconds or less; removing said heater immediately at the end of said period of time and immediately and rapidly forming said overhanging laminate over the periphery of said substrate.

7. The method of claim 6 in which said heating step is conducted by heating said overhanging laminate to a temperature of approximately 335° to 365° F. in a period of approximately 10 to 16 seconds.

8. The method of claim 7 in which said forming step is conducted by wiping said overhanging laminate edge past a former to thereby wipe said overhanging laminate down over the upper edge of said substrate and then moving said former towards the substrate periphery to thereby clamp said laminate against said substrate periphery.

9. The method of claim 8 in which said heating step is conducted by employing radiant heat in a heater having a generally C-shaped cross section, said heater embracing said overhanging laminate.

10. The method of claim 7 in which said heating step is conducted by employing radiant heat in a heater having a generally C-shaped cross section, said heater embracing said overhanging laminate.

11. A method for post forming laminate tops comprising: adhering a strip of insulating material to a substrate at a point generally adjacent the periphery of said substrate; adhering laminate to said substrate over said insulating strip such that a portion of said laminate overhangs said periphery of said substrate; heating said overhanging portion of said laminate and then forming said overhanging portion over said periphery of said substrate.

12. The method of claim 11 in which said adhering step comprises using a strip of paper as said insulating material.

13. The method of claim 12 in which said adhering step comprises using paper approximately 0.006 to 0.008 inches thick.

14. The method of claim 11 in which said heating step comprises heating said overhanging laminate portion in a heater having an ambient temperature of approximately 550° to 750° F. for a period of time of approximately 10 to 16 seconds.

15. The method of claim 14 in which said forming step is conducted by wiping said overhanging laminate edge past a former to thereby wipe said overhanging laminate down over the upper edge of said substrate and then moving said former towards the substrate periphery to thereby clamp said laminate against said substrate periphery.

16. The method of claim 15 in which said heating step is conducted by employing radiant heat in a heater having a generally C-shaped cross section, said heater embracing said overhanging laminate.

17. The method of claim 14 in which said heating step is conducted by employing radiant heat in a heater having a generally C-shaped cross section, said heater embracing said overhanging laminate.

18. The method of claim 11 in which said heating step comprises heating said overhanging laminate to a temperature of at least approximately 335° F. in a period of time of approximately 10 seconds or less.

19. The method of claim 18 in which said heating step is conducted by heating said overhanging laminate to a temperature of approximately 335° to 365° F. in a period of approximately 10 to 16 seconds.

20. The method of claim 19 in which said forming step is conducted by wiping said overhanging laminate edge past a former to thereby wipe said overhanging laminate down over the upper edge of said substrate and then moving said former towards the substrate periphery to thereby clamp said laminate against said substrate periphery.

21. The method of claim 20 in which said heating step is conducted by employing radiant heat in a heater having a generally C-shaped cross section, said heater embracing said overhanging laminate.

22. The method of claim 19 in which said heating step is conducted by employing radiant heat in a heater having a generally C-shaped cross section, said heater embracing said overhanging laminate.

23. A method for post forming laminate tops comprising: concentrating a line of heat along the surface of an overhanging portion of laminate secured to a substrate on the line on which the overhanging portion of laminate must be bent; additionally maintaining an ambient temperature in the area surrounding the overhanging laminate portion which is sufficiently high to soften the overhanging laminate portion; forming said overhanging portion of laminate over the edge of said substrate after said heating step.

24. The method of claim 23 which further includes concentrating heat on the peripheral edge of the substrate, at a point generally below the overhanging laminate portion.

25. The method of claim 24 in which the ambient temperature in the air surrounding the overhanging laminate portion is maintained at a temperature of approximately 550° to 750° F.

26. The method of claim 24 in which said step of maintaining a concentrated line of heat on said surface of said overhanging laminate portion is performd by placing an electric heater having a watt density of approximately 40 watts per square inch at a point approximately 7/16 of an inch above the upper surface of the overhanging laminate portion.

27. The method of claim 26 in which said step of maintaining said ambient temperature at a temperature sufficiently high to soften said overhanging laminate portion is performed by enclosing said overhanging laminate portion and placing a second heat source having a wattage density of approximately 20 watts per square inch at a point spaced approximately 1 5/8 of an inch rearwardly from said first source, within said enclosure, and approximately 15/16 of an inch above the overhanging laminate portion.

28. The method of claim 27 in which said step of concentrating heat on the peripheral edge of the substrate comprises placing a third electric heater having a wattage density of approximately 28 watts per square inch approximately 7/8 of an inch below the overhanging laminate on a vertical plane which extends generally between the first and second electric heating elements.

* * * * *